United States Patent
Kasper et al.

(10) Patent No.: US 7,801,543 B2
(45) Date of Patent: Sep. 21, 2010

(54) DYNAMIC VOCODER ASSIGNMENT IN A COMMUNICATION SYSTEM

(75) Inventors: Melissa D. Kasper, Streamwood, IL (US); Anatoly Agulnik, Deerfield, IL (US); Steven E. Vanswol, Lombard, IL (US)

(73) Assignee: Motorola, Inc., Schaumburg, IL (US)

( * ) Notice: Subject to any disclaimer, the term of this patent is extended or adjusted under 35 U.S.C. 154(b) by 507 days.

(21) Appl. No.: 11/956,649

(22) Filed: Dec. 14, 2007

(65) Prior Publication Data

US 2009/0154658 A1 Jun. 18, 2009

(51) Int. Cl.
*H04B 7/00* (2006.01)
(52) U.S. Cl. .................................. 455/518; 455/63.1
(58) Field of Classification Search .................. 455/518, 455/519, 500, 422.1, 90.2
See application file for complete search history.

(56) References Cited

U.S. PATENT DOCUMENTS

| | | | |
|---|---|---|---|
| 6,256,612 B1 | 7/2001 | Vo et al. | |
| 6,934,756 B2 | 8/2005 | Maes | |
| 7,089,011 B1 | 8/2006 | Mangal | |
| 2007/0281681 A1* | 12/2007 | Holm | 455/422.1 |
| 2008/0081648 A1* | 4/2008 | Kang et al. | 455/500 |

OTHER PUBLICATIONS

PoC User Plane, Approved Version 1.0-09 Jun. 2006, Open Mobile Alliance, OMA-TS_PoC-UserPlane-V2_020060609-A, 2006, Sections 7.2 and 7.3.

* cited by examiner

*Primary Examiner*—Tu X Nguyen

(57) ABSTRACT

An apparatus and method for dynamic vocoder assignment in a communication system that supports multiple vocoders includes a first step (30) of detecting changing a call environment in a group call. A next step (32) includes dynamically determining a list of vocoders in order of system preference in response to the change in call environment. A next step (34) includes communicating the ordered list of vocoders in an existing floor control message to the participants in the call. A next step (36) includes selecting, by at least the current transmitting participant, the first vocoder that it supports from the list of preferred vocoders, for use in that participant's next transmission in the group session.

5 Claims, 3 Drawing Sheets

DYNAMIC VOCODER ASSIGNMENT IN A COMMUNICATION SYSTEM

FIELD OF THE INVENTION

The present invention relates generally to wireless communication networks, and in particular, an apparatus and method for dynamic vocoder assignment in a communication system.

BACKGROUND OF THE INVENTION

Group communications are becoming more important aspects of telecommunication networks, and the demand for such services will continue to increase. For instance, there are presently many different systems and networks that allow group communication. Public safety organizations are particularly interested in group communications and dedicated resources have being provided for these organizations. However, businesses and even personal users also have a desire to use group communication. A group communication has the efficiency of delivering one communication stream to many users instead of providing individual communication stream for each user. One example of this is Push-to-Talk over Cellular (PoC) as defined by the Open Mobile Alliance (OMA).

The OMA has developed PoC protocols for use in group communications. These protocols are used to control group communications sessions including data streams such as audio (voice), video, text messaging, and internet protocols, for example between two or more users (also referred to herein as subscribers) in communication networks. Each subscriber is typically associated with a communication device (also referred to herein as a subscriber unit or user equipment) that is connected to one of the communications network.

As described herein, a group communication can be used to communicate one voice and/or one or more data streams to multiple users. However, each user terminal may not have the same communication capabilities, resulting in some users having a different communication experience from other users in the group. In one example, each user can have a different vocoder capability. One solution to this problem is to configure a group call to use a vocoder of the least capable member of the group call. Another solution to this problem is for a server to transcode the call for a terminal that does not have the capability for a particular codec. However, neither of these solutions address what happens when a new member joins an existing group call. In this case, a subscriber attempting, or paged, to join the group call is required to go through session and resource (e.g. media parameters and codec modes) negotiations with a server supporting that session before being able to join the session. However, even this solution does not address changing conditions or handovers. It should be noted that while the current adding/joining terminal may be able to negotiate with the server, the already joined terminals need to be updated based upon the new terminal's capabilities or based on a changed call environment.

In addition, while the source of the voice stream may or may not be stationary, it is expected that users participating in streaming communications will be operating in a highly mobile, wireless environment. For example, one user might be operating in a broadband network while another user might be operating in a narrowband network. Further, two users operating in the same network might experience changes in service. Each user, regardless of their local conditions is interested in receiving the best voice quality as their current network attachment allows, while also accommodating network condition changes due to mobility or operational changes.

A further solution to address this problem is to provide dynamic feedback from a user terminal to the information sender. However, this solution does not work well for group calls where there may be many different subscribers experiencing many different network conditions. Another problem is the sender must receive and process the feedback information and make decisions on what to send to whom, which takes considerable overhead. This problem is exacerbated where the sender's device is a mobile terminal with limited processing resources.

Therefore, a need exists for an apparatus and method for dynamic vocoder assignment in a communication system. It would also be of further benefit to provide the best available voice quality while limiting the use of transcoding.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

Figure 1:
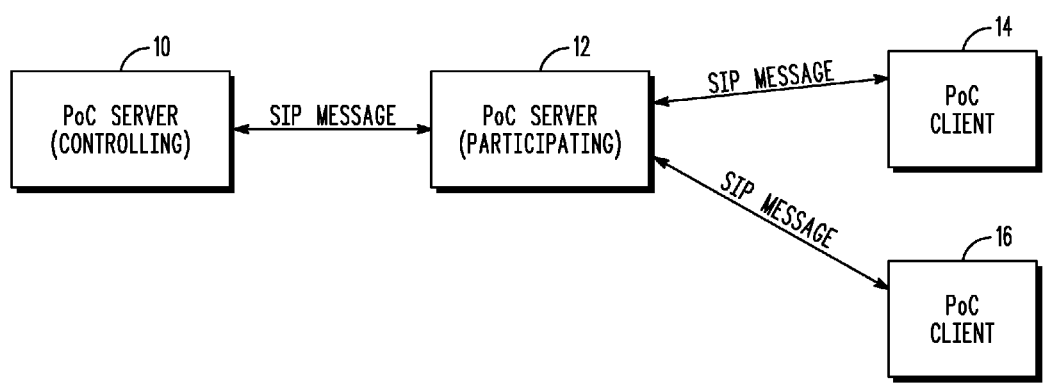
FIG. 1 illustrates a simplified block diagram of entities in a PoC user plane, in accordance with the present invention.

Skilled artisans will appreciate that common but well-understood elements that are useful or necessary in a commercially feasible embodiment are typically not depicted or described in order to facilitate a less obstructed view of these various embodiments of the present invention.

DETAILED DESCRIPTION OF THE PREFERRED EMBODIMENT

The present invention provides an apparatus and method for dynamic vocoder assignment in a communication system. The present invention also has the further benefit of providing the best available voice quality while limiting the use of transcoding, which reduces voice quality. In particular, in a system which supports multiple vocoders, for any single transmission during a group call session the present invention ensures that the minimum number of user equipment (UEs) receive transcoded voice in order to preserve voice quality, depending upon weighting criteria.

For example, if there are nine people in a call and the originator has two vocoders (one high rate broadband that has a much higher mean opinion score (MOS) but is only supported by three other members, and another narrowband codec with a much lower MOS score), the system, deciding through performance weighting factors, may opt for the high rate codec because transcoding may not result in a significant audio quality degradation, even though more users may receive the transcoded audio.

The weighting factor criteria could be to optimize the total call voice quality that may be calculated as simple as the number of users receiving original untranscoded voice, or could include more complicated factors that takes into consideration weighted voice quality degradation due to transcoding from one vocoder to another.

Traditionally, the vocoder to be used in a group communication is negotiated during call setup via a group Session Initiation Protocol (SIP) INVITE message to particular call targets and a SIP 200 OK message returned to the call originator. At this early stage of call establishment, however, the session controller may not know all of the information which would be useful in selecting the vocoder for transmission (for example, all participants may not be known, or their capabilities may not be known if they are served by a different controller, new participants may be invited during the call, etc.). Similarly, transcoder assignment is usually performed during initial call setup, at which point the controller may not know all the information which would be useful in selecting a vocoder for a transmission, and later updates may be cumbersome.

In addition, as the call environment changes, the codec used for transmission needs to change with it in order to offer the best available voice quality. A SIP UPDATE method does exist to re-negotiate a codec during an ongoing call, but has several limitations including: a) an extra message pair is needed to exchange the vocoder information, b) a transmitter vocoder must be tracked on a per-UE basis, and c) there is a potential for transmission delays during the UPDATE procedure.

The present invention resolves these issues by evaluating the vocoder to be used by the current/new talker's UE for transmission during an ongoing call session, and defining specific triggers based on re-evaluating the total call voice quality every time the call environment changes. When a current talker's UE supports more than one vocoder and is able to change its vocoder dynamically between speech bursts, a weighted function (as described above) can be used to select the optimal vocoder which optimizes the total call voice quality. In particular, a weighting function can be used to select the optimal vocoder which maximizes the MOS for the audio quality received by all call participants, thus ensuring that during its transmission the highest level of audio quality is received by the most UEs. This weighting function can include such factors as the UE capabilities, the amount of transcoding needed, the level of quality loss during transcoding from one vocoder to another, the cost to the system to change the transmission vocoder, etc.

The present invention provides a technique to dynamically determine the best vocoder to be used by each participant and the means to deliver this information. The optimal vocoder to be used by the current participant depends on the participant capability and also capabilities of the other participants in the call. The present invention also uses an ordered list of codecs to further reduce the level of individual UE tracking needed by the PoC server, ensuring that each UE is transmitting using the best codec available to it.

Referring to FIG. 1, initiation of a typical PoC group call session includes media parameter (e.g. bandwidth) and codec negotiation between a PoC server 10, 12 and PoC client 14 using Session Description Protocol (SDP) within Session Initiation Protocol (SIP) messages as is known in the art. The controlling PoC Server 10 determines the codec(s) and media parameters to be used in the PoC session. The preferred media parameters can be determined according to the lowest negotiated media parameters of the PoC clients (e.g. 14) that have joined or been invited to the PoC session.

Additionally, the media parameters can be re-negotiated during a PoC session. In addition to the codec(s), the media parameters can include codec modes which are indicated in a preferred order, a bandwidth parameter used to indicate the maximum desired data rate supported by the PoC Client for the PoC Session, and timing parameters, as are known in the art.

The following describes different negotiation procedures: between the call originator and the server and between the server and the targets. In the example herein, client 16 is the originator of a communication and client 14 represent one or more of the target or recipient clients.

To initiate a SIP session a PoC client 16 sends an SIP INVITE message containing an SDP offer with the codec(s) and media parameters offered for the PoC session by PoC client 16. The PoC servers 10 and 12 may modify the original SDP offer and then send SIP INVITE to one of the PoC client targets 14 (i.e. group call recipients). The PoC client 14 responds with a reply SIP message containing the subset of the offered SDP codecs that the PoC client can support along with corresponding media parameters to the PoC Server in the SDP answer of the invitation response (e.g. in the SIP 200 "OK" response). Then the PoC client 16 receives a response SIP message that contains an SDP answer including the granted codec(s) and media parameters for the PoC client 16 to use. If more than one codec is granted in the SDP answer, the invited PoC client 14 should be able to identify the codec used from the Payload Type field of the RTP header.

The participating PoC server 12 can either forward the received media parameters from the PoC client 16 directly to the controlling PoC server 10 or make changes to include the participating PoC Server 12 in the transport path. If the participating PoC server 12 is able to perform speech transcoding, it may indicate additional codec(s) in the SDP offer that is sent to the recipient PoC client(s) 14. In the case where the participating PoC server 12 adds new codec(s) in the SDP offers, the participating PoC server 12 can perform transcoding between the new added codec(s) and the codec(s) that were in the original SDP offer.

When the controlling PoC server 10 responds to the invitation with a final response that contains a SDP answer indicating the selected codec(s) and granted media parameters that should be used by the PoC client 16, the participating PoC server 12 can either forward the invitation response to the PoC client 16 or make changes to include the participating PoC server 12 in the transport path. If the participating PoC server 12 is able to perform the speech transcoding and it has offered additional codec(s) than those contained in the original SDP offer, it can include in the SDP answer only those codec(s) contained in the original SDP offer.

Figure 2:
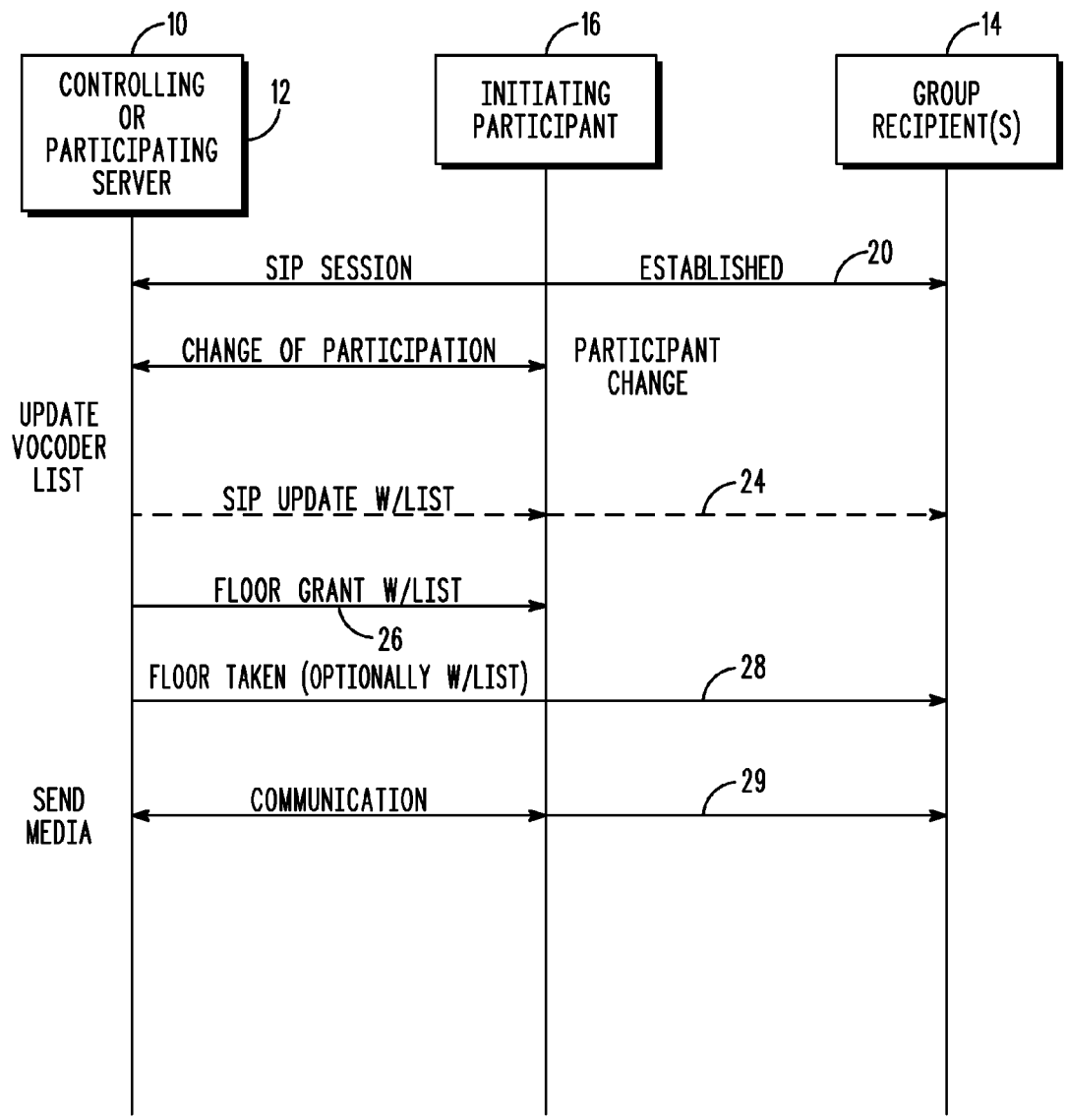
FIG. 2 illustrates a simplified flow diagram of operation, in accordance with the present invention

Referring to FIG. 2, after the session is established 20, a call environment change may take place. This change can be an event that can involve a vocoder change 22. This change is generally referred to herein as a participant change, and as defined herein can involve any one of; one or more participants leaving the established group call, a new participant joining the established group call, a change in capabilities of a current participant due to network conditions or mobility, a new talker that needs to use a vocoder different from the previous one (based on the previous described weighted total voice quality function), or a server directed change. As described and shown in FIG. 2, the participant change used herein as an example is an existing participant that desires to start talking in a group call.

In particular, the controlling PoC server 10 receives a talk request 22 from an originating PoC client 16. The controlling PoC server 10 re-evaluates its list of usable vocoders, without negotiation with the group, and selects the media parameters and codec(s) optimum for the PoC client 16 to use for the transmission. The controlling PoC server 10 responds to the talk request with a message (24 or 26, 28) containing the codec(s) that should be used by the PoC Client 16 (in case of SIP UPDATE 24 the message contains an SDP with necessary media parameters). Where more than one codec is sent, the message includes the updated list of codecs. Preferably, the list is provided in system priority order.

In one embodiment, the message can be a SIP UPDATE message 24 that is sent to the new talker (PoC client 16) with the codec to be used for the transmission. In this embodiment, the message includes a SIP UPDATE with a new offer and a 200 OK response, and then the floor can be granted to the new talker.

In an another preferred embodiment, the message is a FLOOR GRANT message 26 that includes the list (one or more) of codecs to the participant 16 requesting to talk. Subsequent to that, a FLOOR TAKEN message 28 optionally sends the list of one or more codecs to the recipient participant(s) 14. This could be utilized by those current recipients who might be the next future talkers, in that these future talkers' UEs will know which vocoder to use, and can allow the user to begin talking 29 and start utilizing that chosen vocoder before a FLOOR GRANT is received, thereby reducing delays.

In the case where the participant change involves the controlling PoC server 10 inviting the recipient PoC client 14 to the group call, the invitation request 22 from the controlling PoC server 10 to the participating PoC Server 12 contains the SDP offer with the codec(s) and media parameters. The controlling PoC server 10 receives 22 the invited recipient PoC client(s) 14 supported codec(s) and media parameters in an invitation response 22 containing an SDP offer. If the controlling PoC server 10 is able to perform the speech transcoding, it can add to an SDP offer the codec(s) which can be transcoded to those contained in the original SDP offer from the originating PoC client 16 before sending it towards the end invited recipient PoC Client 14. If the controlling PoC server 10 is able to perform speech transcoding and it has offered more codec(s) than those contained in the original SDP offer, it includes in the SDP answer only those codecs contained in the original SDP offer.

In accordance with the present invention, another participant change involves the codec(s) and media parameters being re-negotiated upon one of the PoC clients 14, 16 roaming to a different network with different media parameters, leaving the call, or when a new PoC Client with a media parameter and codec capability that differs from the codec set of the other participants enters the group call session. This is accomplished through user plane adaptation between the PoC clients and the controlling PoC server. During an existing PoC session group call, a PoC client may change the voice frame packetization or voice codec mode by out-of-band signaling using an SDP payload within SIP messages. When a new PoC client (not shown) enters a PoC group call session the new PoC client sends a SIP message 22 with an SDP payload that indicates the initial media parameters and codec of the new PoC client to the controlling PoC server.

The PoC server 10 can initiate a re-negotiation of the media parameters and codec(s) of the PoC session with the new PoC client. Additionally, the new PoC client may initiate the user plane adaptation to re-negotiate with exiting participants by roaming to a system with different media parameters, for example. Further, the controlling PoC server 10 may initiate the user plane adaptation (i.e. re-negotiation during a PoC session) when a new PoC client with lower media parameters or coded capability enters or leaves the PoC session. The participating PoC server 12 supports any re-negotiation by forwarding the SIP/SDP payloads between the controlling PoC server 10 and PoC client.

When determining the preferred system media parameters and codecs the controlling PoC server 10 dynamically takes into account the highest common media parameters and codec(s) provided by both new and existing participants in the PoC session (i.e. the negotiation procedure make all the participants of the PoC session adapt to the common highest denominator in terms of bandwidth usage if possible). In the case where different media parameters of a new participant are introduced, the controlling PoC server 10 dynamically updates all the other participants in the PoC Session, in accordance with the present invention.

Specifically, the present invention provides that when a change in vocoder is needed, the system shall convey this to the PoC clients. A change in vocoder during a call is typically needed when a change in the call environment is detected, such as when a client roams to a system with different media parameters, there is a new participant in the call with lower codec capabilities, or an existing participant with the lowest codec capability leaves the call, for example. The controlling PoC server monitors the group call and detects such a change of call environment in the group call, and determines whether a vocoder change is needed. In particular, the controlling PoC server, in order to minimize transcoding, determines the optimum (highest capable) vocoder among the multiple available system vocoders to use in response to the change in call environment for each transmission in the call session, and transcodes the communication 29 for those clients unable to use the optimum vocoder.

To accomplish this change, any client with a transmitter which supports more than one vocoder and is able to change its vocoder dynamically must be informed of the optimal vocoder. Therefore, the controlling PoC server with communicate information associated with at least the optimum vocoder in SIP UPDATE or floor control messaging to at least the transmitting participant in the group session. The other listening participants can also act on the vocoder change, allowing the optimum vocoder to be selected and used by the client, if that participant supports that optimum vocoder, for use in that participant's next transmission in the group session.

In accordance with the present invention, the SIP UPDATE or floor control messaging is enhanced with the vocoder information to provide the optimum codec offering. This can include offering a single codec identification in the messaging, or instead the messaging can include an identification list of available codecs, preferably in order of system preference. The recipient will select and use the highest weighted vocoder it recognizes and is capable of transmitting with. If none are recognized, the previously negotiated codec can continue to be used, and/or transcoding can be supplied by the server or a media gateway for those subscribers which do not support the current talking subscriber's vocoder.

Preferably, the controlling PoC server can determine the optimal vocoder using weighting factors as subscriber capabilities, the amount of transcoding needed, the level of quality loss during transcoding, system cost to change vocoder, etc.

Advantageously, by the novel use of modified SIP UPDATE or floor control messaging to convey vocoder information, all participants in the group call can be informed about the optimal vocoder simultaneously and without individual specialized message exchange or formatting with each subscriber, which would consume overhead resources. In addition, there is no impact to call setup or floor change duration due to this vocoder update technique, and therefore there will be no missed audio or floor control delays while this technique is being used.

Figure 3:
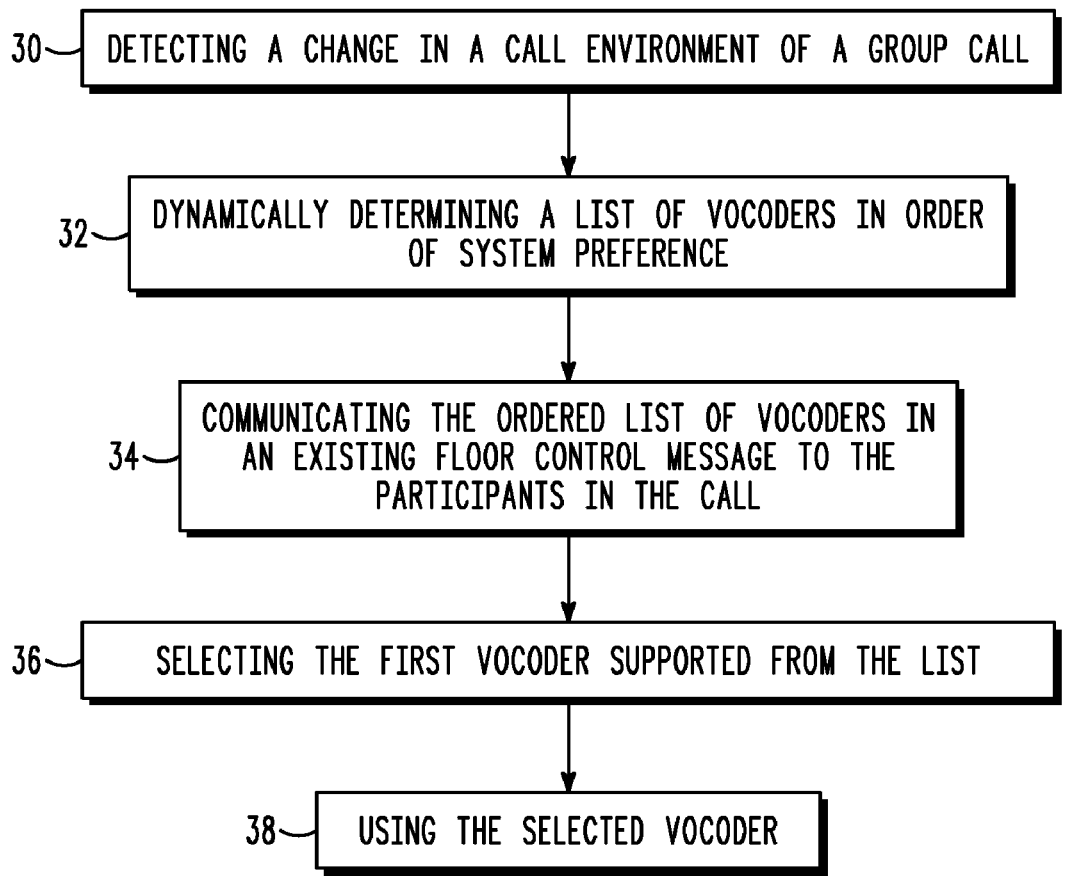
FIG. 3 illustrates a method, in accordance with the present invention.

Referring to FIG. 3, the present invention includes a method for dynamic vocoder assignment in a current group call session among participants in a communication system that supports multiple vocoders. The method includes a first step of changing 30 a call environment in the group call involving a status change of a participant, which the server can then determine through SIP messaging. This change can involve a participant leaving the established group call, a new participant joining the established group call, a participant initiating a request to talk (with its capabilities are provided during the INVITE-200OK dialog), a participant changing its capabilities by roaming to another network, or a server directed change. For example, a client leaving the group might have had a unique vocoder among the group, which the server could then delete from its list. In another example, a joining client also might have a unique vocoder among the group, by which the server could then change its vocoder list due to the new user because the weighting factors result in a change in vocoder priorities. Such changes in the call environment can trigger the change of the best vocoder to use for transmission for some participants. If so, then those changes shall be conveyed to at least those participants' UE.

In a next step 32, the server determines an optimum (highest capable) vocoder among the multiple vocoders to use in response to the change in call environment. Preferably, the list can be updated dynamically in response to changes in the call environment. This determination can include selecting only the optimum vocoder or ordering a list of vocoders that can be used in at least one of the participating clients. Preferably, the list is ordered by system preference, from most optimum to least optimum, for quality of transmission for example. In addition, the system preference order of the vocoders can be determined in response to weighting factors including; subscriber communication capability, an amount of transcoding needed, a level of quality loss during transcoding, and a system cost to change vocoders.

In a next step 34, the server communicates information associated with at least the optimum vocoder in an existing message to at least a transmitting participant in the group session. The existing message can include a SIP UPDATE message, a FLOOR GRANT message, and/or a FLOOR TAKEN message, as are known in the art. In particular, the existing message includes additional information, such as an additional header, describing the optimum vocoder. More particularly, the existing message includes additional information describing an updated list of one or more vocoders, in order of system preference, preferably.

In a next step 36, at least one of the clients selects the optimum vocoder, For example, the transmitting participant can select the optimum vocoder if that participant supports that optimum vocoder, for use in that participant's next transmission (packet burst) in the group session. Alternatively, one of the presently receiving clients can select the optimum vocoder for a future transmission where that presently receiving participant may become a new transmitting participant.

In a next step 38, as the transmitting participant begins talking with the selected optimum vocoder, the recipient participants can also use the optimum vocoder to receive, if the recipient participant is so capable. If this is not possible, the server can transcode communications for those participants which do not support the vocoder currently being used by the transmitting client.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for dynamic vocoder assignment in a current group call session among participants in a communication system that supports multiple vocoders, the method comprising:

detecting a change in a call environment in the group call;

dynamically determining a list of vocoders operable in the communication system in order of system preference in response to the change in call environment;

communicating the ordered list of vocoders in a floor control message to the participants in the group session; and selecting, by at least the transmitting participant, the first vocoder that it supports from the list of vocoders, for use in that participant's next transmission in the group session;

wherein determining includes determining the system preference order of the vocoders in response to weighting factors; and wherein the weighting factors include a level of quality loss during transcoding.

2. The method of claim 1 further comprising:

transcoding for those recipient participants which do not support any of the vocoders in the list.

3. The method of claim 1 wherein the weighting factors include a subscriber communication capability.

4. The method of claim 1 wherein the weighting factors include an amount of transcoding needed.

5. The method of claim 1 wherein the weighting factors include a system cost to change vocoders.

* * * * *